(12) United States Patent
Agarwal

(10) Patent No.: US 9,324,042 B2
(45) Date of Patent: Apr. 26, 2016

(54) AUTOMATICALLY INITIATING PRODUCT REPLENISHMENT

(75) Inventor: Amit D. Agarwal, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 70 days.

(21) Appl. No.: 13/358,464

(22) Filed: Jan. 25, 2012

(65) Prior Publication Data
US 2012/0136741 A1    May 31, 2012

Related U.S. Application Data

(63) Continuation of application No. 09/558,313, filed on Apr. 25, 2000, now Pat. No. 8,126,784.

(60) Provisional application No. 60/169,721, filed on Dec. 8, 1999.

(51) Int. Cl.
| | | |
|---|---|---|
| *G06Q 30/00* | (2012.01) | |
| *G06Q 10/00* | (2012.01) | |
| *G06Q 10/08* | (2012.01) | |
| *G06Q 20/20* | (2012.01) | |
| *G06Q 30/06* | (2012.01) | |

(52) U.S. Cl.
CPC .............. *G06Q 10/00* (2013.01); *G06Q 10/087* (2013.01); *G06Q 20/203* (2013.01); *G06Q 30/0601* (2013.01); *G06Q 30/0641* (2013.01)

(58) Field of Classification Search
USPC ............................................ 705/26.1, 22, 28
See application file for complete search history.

(56) References Cited

U.S. PATENT DOCUMENTS

| | | | | |
|---|---|---|---|---|
| 5,655,174 | A | * | 8/1997 | Hirst ................................ 399/27 |
| 5,909,023 | A | * | 6/1999 | Ono et al. ..................... 235/380 |
| 6,026,376 | A | * | 2/2000 | Kenney ....................... 705/26.61 |
| 6,204,763 | B1 | * | 3/2001 | Sone .......................... 340/568.1 |
| 6,712,276 | B1 | * | 3/2004 | Abali et al. .................. 235/492 |
| 6,924,781 | B1 | * | 8/2005 | Gelbman ........................ 345/85 |
| 2007/0210155 | A1 | * | 9/2007 | Swartz et al. ................. 235/383 |

* cited by examiner

*Primary Examiner* — Ryan Zeender
*Assistant Examiner* — Christopher Buchanan
(74) *Attorney, Agent, or Firm* — Fenwick & West LLP

(57) ABSTRACT

A facility for assessing product replenishment is described. The facility determines that a purchasing entity possesses an item, determines an expiration time for the item, and schedules, for a time preceding the expiration, a unilateral communication to the purchasing entity indicating that the item should be replenished. The facility can also manage automatic item replenishment, including determining a target date for replenishment of the item, transmitting to the purchaser in advance of the target date (when the purchaser is not engaged in an electronic shopping activity) a replenishment proposal, and ordering a replacement for the item. In some cases, the facility places an order within a predetermined tolerance of the target date without intervention by the consumer. The facility can also establish and test a condition for suggesting replenishment, can raise an event when the condition is satisfied, and can unilaterally make the replenishment suggestion when the event is raised.

21 Claims, 4 Drawing Sheets

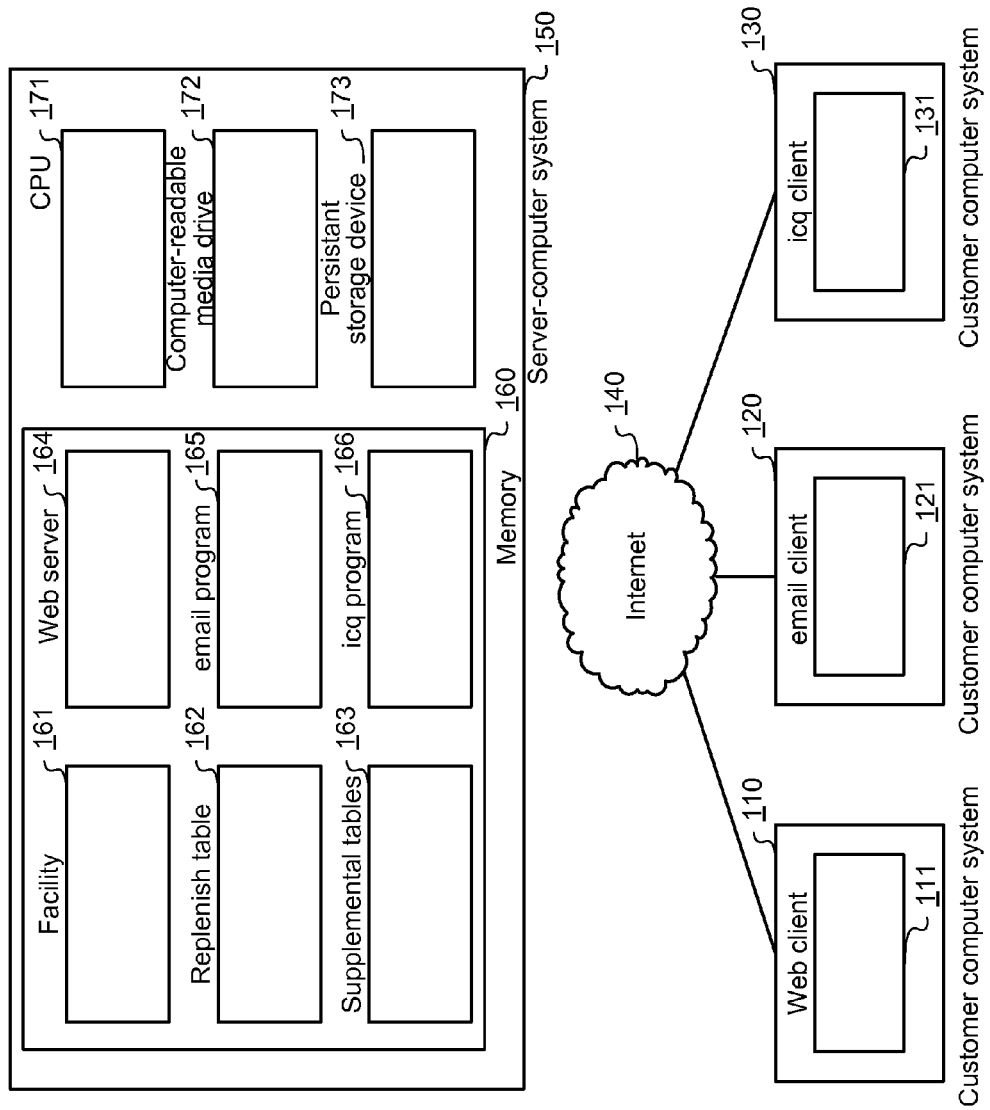

ACME Web Merchants

Mr. King,
According to our records, it is likely now time for you to replenish the following item(s):

| quantity | description | unit price | delivery date |
|---|---|---|---|
| 1 | Pinnacle shaving gel – 12 oz can | $ 1.69 | 11/30/99 |
| 2 | Freshest 2% milk - ½ gallon carton | $ 2.10 | 11/30/99 |

210
211 212
213 214

Please select among the following options, first changing the quantity or delivery date, if necessary:

221 Order as above
222 Remind me again in a few days
223 No, thanks

FIG. 3

Replenish table 300

| target date | customer identifier | item identifier | quantity | replenishment interval |
|---|---|---|---|---|
| 11/30/99 | 15 | 110 | 1 | 48 days |
| 11/30/99 | 15 | 220 | 1 | 10 days |
| 12/1/99 | 23 | 9994 | 2 | n/a |

FIG. 4

Item table 400

| item identifier | description | unit price |
|---|---|---|
| 110 | Pinnacle shaving get – 12 oz. can | $1.69 |
| 220 | Tabletto PDA | $395.95 |
| 9994 | Freshest 2% milk – ½ gallon | $2.10 |

FIG. 5

Customer table 500

| customer identifier | customer name | contact information type | contact information |
|---|---|---|---|
| 15 | Mr. King | email address | king@connect.net |
| 17 | Ms. Pierce | website cookie | 17 |
| 23 | Mr. Pope | icq address | 20829745 |

AUTOMATICALLY INITIATING PRODUCT REPLENISHMENT

CROSS REFERENCE TO RELATED APPLICATIONS

This application is a continuation of U.S. patent application Ser. No. 09/558,313, filed Apr. 25, 2000, which claims the benefit of U.S. Provisional Patent Application No. 60/169,721, filed Dec. 8, 1999, both of which are hereby incorporated by reference herein in their entireties.

TECHNICAL FIELD

The present invention is directed to the field of electronic commerce, and, more particularly, to the field of marketing processes.

BACKGROUND

Because it facilitates electronic communications between merchants and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a merchant's computer. The purchaser can then interact with the merchant's computer to conduct the transaction.

The World Wide Web application of the Internet is an especially effective environment for electronic commerce. Many Web applications have been developed through which merchants can advertise and sell items. In particular, many such "Web merchants" sell physical items, such as books, that are delivered through conventional physical shipment channels, such as a common carrier.

While Web merchants have gained significant market share from traditional storefront merchants for many types of products, consumers have demonstrated a measure of reluctance about purchasing some types of products from Web merchants. In particular, consumable products such as food staples and personal care items have proven difficult for Web merchants to sell in significant quantities.

This is at least in part because of the way in which a consumer's need for such consumable products commonly arises. It is common for a consumer to first realize that a consumable product must be replenished when the consumer exhausts his or her supply of the consumable product. For example, a consumer may not realize that he or she needs to purchase more shaving gel until his or her current supply is exhausted. Because of the regularity with which many consumable items are used, such products often must be replenished within a very short time of their exhaustion. For example, a consumer may need to replenish exhausted shaving gel within one day. Because of the short time in which most consumable products must be replenished, Web merchants are typically unable to deliver them in time. Further, aside from delivery time issues, it seldom occurs to consumers to purchase such products from a Web merchant.

This is unfortunate, since conventional approaches to this problem leave much to be desired. In order to replenish such products, it is typical for a consumer to make a special trip to a traditional storefront merchant, thereby expending significant time, as well as substantial expense for fuel, parking, etc. To address this issue, many purchasers go to the lengths of purchasing outlandish quantities of such products in order to reduce the frequency with which they must face the task of replenishing them. Such a strategy requires the commitment of a large amount of space in the purchaser's car and storage space in the purchaser's home, however, as well the acceleration of a significant aggregated cost.

Accordingly, a facility for automatically initiated replenishment of such products would have significant utility.

BRIEF DESCRIPTION OF THE DRAWINGS

FIG. 1 is a high-level block diagram showing the environment in which the facility preferably operates.

FIG. 2 is a display diagram showing a sample replenishment suggestion provided by the facility.

FIG. 3 is a data structure diagram showing sample contents of a replenish table.

FIG. 4 is a data structure diagram showing sample contents of an item table.

FIG. 5 is a data structure diagram showing sample contents of a customer table.

DETAILED DESCRIPTION

Figure 6:
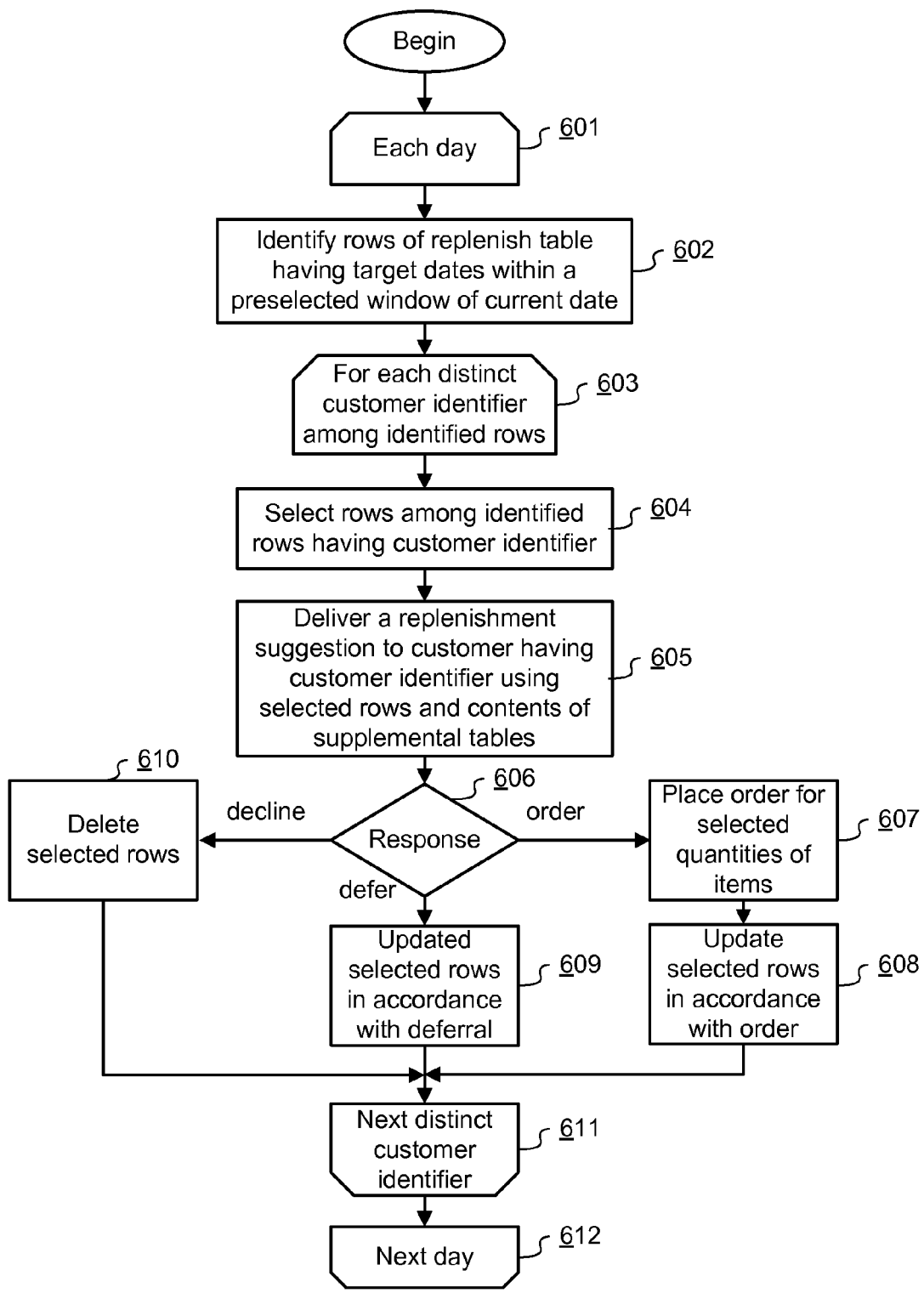
FIG. 6 is a flow diagram showing the steps preferably performed by the facility in order to present replenishment suggestions.

In a preferred embodiment, an item replenishment facility ("the facility") automatically initiates the replenishment of items such as physical products. Based upon a variety of information, the facility establishes a target date on which an item presently being used by a customer should probably be replenished. In advance of the target date, using the indication, the facility provides a replenishment suggestion to the customer through one of a variety of channels. The replenishment suggestion preferably indicates which products should be replenished, and preferably includes a control for the customer to use to request the replenishment of the listed items. In response to the operation of this control by the customer, the facility places an order for the items on the customer's behalf. The order is preferably placed with a Web merchant associated with the operator of the facility, but may be alternatively placed with one of a larger list of affiliated merchants, or may be placed with a merchant identified as providing the best terms (in terms of such factors as price and delivery time) in a real-time search for merchants. In further preferred embodiments, the replenishment suggestion generated by the facility contains additional controls that enable the user to modify the order before approving it, or to defer or decline the replenishment suggestion. In a preferred embodiment, the facility initiates the replenishment of a particular item in response to an explicit "subscription request" from the user for the item. In some embodiments, the facility solicits such subscription, either at the time an order is placed for the item, when the user requests information about the item, or at another time.

By anticipating the customer's need to replenish a product, the facility provides a convenient way for customers to replenish consumable items. Because the facility does not rely upon the customer to identify the need for replenishment, the facility enables replenishment to be initiated at a time early enough to accommodate a typical delivery cycle. Further, because the facility proactively initiates contact with the customer, it overcomes the failure by many customers to realize that a Web merchant can be gainfully used to replenish the items in question. It can therefore be seen that the facility provides significant utility.

The facility preferably uses past purchases to establish replenishment target dates for particular items on behalf of particular users. For example, for products that are used up, such as shaving gel, the facility preferably establishes a target date based upon the last date on which the item was purchased, the quantity of the item then purchased, and an estimate of the rate at which the item will be depleted. The facility preferably arrives at such a rate by utilizing an average household consumption rate (one that, e.g., indicates that an average household consumes 0.25 oz. of shaving gel per day); by using information provided by the customer, such as a survey response from the customer that indicates that on an average day, two shaving sessions occur; or based on observed information about the customer and the customer's household, such as the historical frequency with which the customer has purchased the item, the historical frequency with which the customer has purchased a complement of the item (e.g., replacement shaver blades) or lifestyle information about the customer (e.g., that the customer recently purchased a beard trimmer and therefore probably has a beard and will consume less shaving gel). For items that expire at a particular time irrespective of the rate of their consumption, such as milk, the facility may use the expiration date as the target date. Also, for some purchasers, the availability of a new or improved replacement for an item that they are using creates an impetus to replace, or "replenish" the item. For example, certain purchasers will want to purchase the next version of a particular type of personal digital assistant as soon as it is available, the new album from a particular musical artist as soon as it is available, etc. Accordingly, for these customers and items, the facility preferably establishes a target date based upon the date on which the new or improved version will become available.

FIG. 1 is a high-level block diagram showing the environment in which the facility preferably operates. The diagram shows several customer computer systems, such as customer computer systems 110, 120, and 130. Each of the customer computer systems preferably has one or more programs for receiving information on a customer's behalf. For example, customer computer system 110 has a Web client computer program 111 for accessing Web pages on a Web server. Customer computer system 120 has an email client 121 for receiving email messages. Customer computer system 130 has an icq client 131 for receiving icq instant messages.

The customer computer systems are connected via the Internet 140 to a server computer system 150. The server computer system 150 contains a memory 160. The memory preferably contains the replenishment facility 161, a replenish table 162 and supplemental tables 163 for storing information used by the facility, a Web server program 164 for serving Web pages, an email program 165 for sending email messages, and an icq program 166 for sending icq instant messages. While items 161-166 are preferably stored in memory while being used, those skilled in the art will appreciate that these items, or portions of them, may be transferred between memory and a persistent storage device 173 for purposes of memory management and data integrity. The server computer system further contains one or more central processing units in (CPU) 171 for executing programs, such as programs 161, 164, 165, and 166, and a computer-readable medium drive 172, such as a CD-ROM drive, for reading information or installing programs such as the facility from computer-readable media, such as a floppy disk, a CD-ROM, or a DVD.

While preferred embodiments are described in terms of the environment described above, those skilled in the art will appreciate that the facility may be implemented in a variety of other environments, including a single, monolithic computer system, as well as various other combinations of computer systems or similar devices connected in various ways.

To more fully illustrate its implementation and operation, the facility is described in conjunction with an example. FIG. 2 is a display diagram showing a sample replenishment suggestion provided by the facility. The replenishment suggestion may preferably be sent to a customer as an email message, as an icq instant message, or as another type of message. The replenishment suggestion may further be presented to customer as a Web page, either when the customer visits a Web site for the replenishment facility, or when the customer visits another, associated Web site. The replenishment suggestion may also be provided in audio form, such as in an automatically initiated telephone call or an automatically delivered voicemail message. Those skilled in the art will appreciate that there are additional media through which the facility can also provide replenishment suggestions.

The sample replenishment suggestion 200 indicates that it is time to replenish one or more items, and includes information 210 describing the item or items that are to be replenished. The information 210 preferably includes, for each item, the quantity to be ordered, a description of the item, the item's unit price, and the delivery date for the item. To order the listed items in the listed quantities on the listed delivery dates, the customer simply clicks an "order as above" button 221. Clicking on the "order as above" button is preferably the only interaction that the user needs to perform to order the listed items in the listed quantities on the listed delivery dates. To change the quantity of one of the items, before clicking the "order as above" button, the customer replaces the suggested quantity with a new quantity. For example, to order three cartons of milk instead of the suggested quantity of two cartons of milk, the customer replaces the quantity "2" in text box 213 with the quantity "3". To change the delivery date of one of the items, before clicking the "order as above" button, the customer replaces the suggested delivery date with a new delivery date. For example, to order the shaving gel for delivery on November 20th rather than on November 30th as suggested, the customer replaces the date "11/30/99" in text box 212 with the date "11/20/99".

If the customer does not wish to place an order in response to the replenishment suggestion, the customer may decline the suggestion by clicking a "no thanks" button 223, or may defer the suggestion until later by clicking a "remind me again in a few days" button 222.

FIGS. 3-5 are data structure diagram showing data tables preferably used by the facility. FIG. 3 is a data structure diagram showing sample contents of a replenish table. The replenish table 300 is used to identify items that need replenishing, and is generated by the facility based on customer order history, other information obtained by the customer, statistical measures of item usage, information about the availability of item upgrades, and other similar information. Each row of the replenish table corresponds to a single item that will at some point need replenishing. Each row is divided into five fields, including a target date field 301 indicating the date for which replenishment should be suggested; a customer identifier field 302 identifying the customer to whom a replenishment suggestion is to be provided; an item identifier field 303 identifying the item to be replenished; a quantity field 304 indicating the quantity of the item that is to be suggested; and a replenishment interval field 305 identifying the time interval at which the specified quantity should be replenished. For example, row 311 indicates that it should be suggested to customer number 15 that one of item number 110 should be replenished on Nov. 30, 1999, and every 48 days thereafter. Because a typical replenish table may contain a very large number of rows, the facility preferably maintains an index on its target date field and/or on its customer identifier field to expedite access to the replenish table.

FIG. 4 is a data structure diagram showing sample contents of an item table. The item table 400 is used to store information about particular items. Each row of the item table corresponds to one item. Each row is divided into three fields, including an item identifier field 401 containing the item identifier for the item, a description field 402 containing a description of the item, and a unit price field 403 indicating the unit price of the item. For example, row 411 indicates that item number 110 has description "Pinnacle shaving gel—12 oz. can", and unit price $1.69.

FIG. 5 is a data structure diagram showing sample contents of a customer table. The customer table 500 is used to store information about customers. Each row of the customer table corresponds to one customer. Each row is divided into four fields, including a customer identifier field 501 containing the customer identifier for the customer; a customer name field 502 containing the customer's name; a contact information type field 503 indicating how the customer is to be contacted with replenishment suggestions; and a contact information field 504 contain an address to be used to contact the customer with replenishment suggestions. For example, row 511 indicates that the name of customer number 15 is "Mr. King," and that he is to receive replenishment suggestions via email at the email address "king@connect.net."

FIG. 6 is a flow diagram showing the steps preferably performed by the facility in order to present replenishment suggestions. Each day the facility loops once through steps 601-612. In step 602, the facility identifies any rows of the replenish table having target dates within a preselected window of the current date. As an example, the window may be selected to be about two weeks long to provide plenty of time for the items to be shipped to customers. In step 603, the facility loops through steps 604-610 once for each distinct customer identifier among the rows identified in step 602. In step 604, the facility selects rows among the identified rows having the current customer identifier. In step 605, the facility generates a replenishment suggestion using the selected rows of replenish table and the contents of supplemental tables, such as the item table and the customer table, then delivers the replenishment suggestion to the customer having the current customer identifier.

In step 606, if the customer responds to the replenishment suggestion with an order request, the facility continues in step 607. If the customer responds to the replenishment suggestion with a deferral request, the facility continues in step 609. If the customer response to the replenishment suggestion with a decline request, then the facility continues in step 610. To process an order request, in step 607, the facility places an order for the selected quantities of items to arrive on the selected delivery dates. In step 608, the facility updates the selected rows in accordance with the placed order, such as by setting a new, later target date for the ordered items for further replenishment. After step 608, the facility continues in steps 611. To process a deferral request, in step 609, the facility updates the selected rows in accordance with the deferral request, such as by setting a new, later target date for which to repeat the replenishment suggestion. After step 609, the facility continues in step 611. To process a decline request, in step 610, the facility deletes the selected rows. In step 611, the facility loops back to step 603 to process the next distinct customer identifier among the identified rows. After all of the distinct customer identifiers among the identified rows have been processed, the facility continues in step 612. The step 612, the facility loops back to step 601 to process the next day.

In an alternative preferred embodiment, the facility is implemented using an event-driven architecture. In this embodiment, the facility includes an event-raising component that raises an event each time an item is to be replenished, and an event-handling component that, for each such event, places an order for the item specified by the event, optionally first confirming the order with the client as shown in FIGS. 2 and 6. The facility's event raising component preferably raises a replenishment event when a target date is reached, or when other information indicates that replenishment should occur, such as when an indication is received that an improved replacement for a particular item is now available.

It will be understood by those skilled in the art that the above-described facility could be adapted or extended in various ways. For example, the facility is not limited to items that are tangible products. Rather, the facility may also initiate the replenishment of items that are data products, such as compilations of information or computer programs, or the replenishment of service items, or the replenishment of items of other types. Additionally, rather than providing a replenishment suggestion that must be responded to for each replenishment cycle, the facility may instead obtain the customer's preapproval for automatic replenishment, and thereafter automatically submit an order for each replenishment cycle without further approval by the customer. While the foregoing description makes reference to preferred embodiments, the scope of the invention is defined solely by the claims that follow and the elements recited therein.

I claim:

1. A method in a data processing system for assessing item replenishment, comprising:

receiving, at a server computer system via the Internet, an electronic transmission from a purchasing entity, the received electronic transmission comprising an instruction to purchase a first item through an online item ordering facility;

accessing, in a memory unit of the server computer system, purchase history information mapped to the purchasing entity;

responsive to a determination, based on the purchase history information, that the purchasing entity purchased a second item, probabilistically determining, using one or more computer processors of the server computer system, that the purchasing entity follows a particular lifestyle preference;

determining a target replenishment time for the first item based on at least the lifestyle preference followed by the purchasing entity;

storing the target replenishment time in a replenish repository included in the memory unit; and responsive to receiving a request for a web page via the Internet from a computing device, the request associated with the purchasing entity via a website cookie:

accessing the replenishment repository to determine that the first item should be replaced; and transmitting the web page to the computing device, wherein the web page causes to be displayed on a display of the computing device a name of the first item and a user interface element that enables the purchasing entity to replenish the first item from the online item online item ordering facility by interacting with the user interface element.

2. The method of claim 1, further comprising:
receiving an indication that the purchasing entity used the user interface element displayed on the web page to order an additional item to replenish the first item; and
in response solely to receiving the indication, ordering an additional item to replenish the first item.

3. The method of claim 1, wherein the user interface element is usable by the purchasing entity to request replenishment of the first item by performing a single action of selecting a control button.

4. The method of claim 1, wherein the target replenishment time is determined further based on an expiration date of the first item and a rate at which the first item is consumed by a plurality of purchasing entities that have previously purchased the first item.

5. The method of claim 1, wherein the target replenishment time is determined further based on a last date on which the first item was purchased by the purchasing entity and a quantity of the first item purchased on the last date.

6. The method of claim 1, wherein the target replenishment time is determined further based on a rate at which the first item is consumed by the purchasing entity.

7. The method of claim 6, further comprising computing the rate based on a historical frequency with which the purchasing entity has previously purchased a complement item to be used in conjunction with the first item.

8. The method of claim 1, wherein the target replenishment time is determined further based on a date on which a new version of the first item will become available.

9. A non-transitory computer-readable medium that stores instructions that, when executed by a computer processor, cause the computer processor to:
receive, at a server computer system via the Internet, an electronic transmission from a purchasing entity, the received electronic transmission comprising an instruction to purchase a first item through an online item ordering facility;
access, in a memory unit of the server computer system, purchase history information mapped to the purchasing entity;
responsive to a determination, based on the purchase history information, that the purchasing entity purchased a second item, probabilistically determine that the purchasing entity follows a particular lifestyle preference;
determine a target replenishment time for the first item based on at least the lifestyle preference followed by the purchasing entity;
store the target replenishment time in a replenish repository included in the memory unit; and
responsive to receiving a request for a web page via the Internet from a computing device, the computing device associated with the request via a website cookie:
access the replenishment repository to determine that the first item should be replaced; and
transmit the web page to the computing device, wherein the web page causes to be displayed on a display of the computing device a name of the first item and a user interface element that enables the purchasing entity to replenish the first item from the online item online item ordering facility by interacting with the user interface element.

10. The computer-readable medium of claim 9, wherein the instructions further cause the computer processor to:
receive an indication that the purchasing entity used the user interface displayed on the web page to order an additional item to replenish the first item; and
in response solely to receiving the indication, ordering an additional item to replenish the first item.

11. The computer-readable medium of claim 9, wherein the target replenishment time is determined further based on an expiration date of the first item and a rate at which the first item is consumed by a plurality of purchasing entities that have previously purchased the first item.

12. The computer-readable medium of claim 9, wherein the target replenishment time is determined further based on a last date on which the first item was purchased by the purchasing entity and a quantity of the first item purchased on the last date.

13. The computer-readable medium of claim 9, wherein the target replenishment time is determined further based on a rate at which the first item is consumed by the purchasing entity.

14. The computer-readable medium of claim 13, wherein the instructions further cause the processor to compute the rate based on a historical frequency with which the purchasing entity has previously purchased a complement item to be used in conjunction with the first item.

15. The computer-readable medium of claim 9, wherein the target replenishment time is determined further based on a date on which a new version of the first item will become available.

16. A system for automatic item replenishment, comprising:
a computer processor executing:
an order history repository included in a first memory unit that stores a
a replenishment targeting subsystem that, for a first item purchased by a purchaser on a purchase date from an item ordering facility, probabilistically determines that the purchaser has a particular lifestyle preference based on the purchasing entity having purchased a second item after the first item, determines a target date for replenishment of the first item based on the determined preference, and stores the target date in a replenish repository included in a second memory unit;
a replenishment proposal subsystem that accesses the replenish repository, at a time preceding the target date, to determine that a replenishment suggestion is to be displayed to the purchaser, the replenishment suggestion indicating that the first item should be replaced, and transmits to a computing device associated with the purchaser in advance of the target date, a web page, wherein the web page causes to be displayed on a display of the computing device a name of the first item and a user interface element that enables the purchaser to replenish the first item from the online item online item ordering facility by interacting with the user interface element, wherein transmitting the web page is responsive to receiving a request for the web page via the Internet from the computing device, the computing device associated with the purchaser via a website cookie; and
a replenishment ordering subsystem that orders a replacement for the first item responsive to an interaction with the user interface element by the purchaser.

17. The system of claim 16, wherein the target replenishment time is determined further based on an expiration date of the first item and a rate at which the first item is consumed by a plurality of purchasing entities that have previously purchased the first item.

18. The system of claim 16, wherein the target replenishment time is determined further based on a last date on which the first item was purchased by the purchasing entity and a quantity of the first item purchased on the last date.

19. The system of claim 16, wherein the target replenishment time is determined further based on a rate at which the first item is consumed by the purchasing entity.

20. The system of claim 19, wherein the rate is computed based on a historical frequency with which the purchasing entity has previously purchased a complement item to be used in conjunction with the first item.

21. The system of claim 16, wherein the target replenishment time is determined further based on a date on which a new version of the first item will become available.

* * * * *

UNITED STATES PATENT AND TRADEMARK OFFICE
CERTIFICATE OF CORRECTION

PATENT NO. : 9,324,042 B2
APPLICATION NO. : 13/358464
DATED : April 26, 2016
INVENTOR(S) : Amit D. Agarwal Page 1 of 1

It is certified that error appears in the above-identified patent and that said Letters Patent is hereby corrected as shown below:

In the Claims
Column 6, line 66, Claim 1, delete "online item online item ordering facility" and insert --online item ordering facility--.
Column 7, lines 60-61, Claim 9, delete "online item online item ordering facility" and insert --online item ordering facility--.
Column 8, line 31, Claim 16, delete "stores a" and insert --stores:--.
Column 8, lines 51-52, Claim 16, delete "online item online item ordering facility" and insert --online item ordering facility--.

Signed and Sealed this
Ninth Day of August, 2016

Michelle K. Lee
*Director of the United States Patent and Trademark Office*